(12) United States Patent
Roberts et al.

(10) Patent No.: US 10,191,863 B2
(45) Date of Patent: Jan. 29, 2019

(54) MAPPING ATTRIBUTES OF KEYED ENTITIES

(71) Applicant: Ab Initio Technology LLC, Lexington, MA (US)

(72) Inventors: Jed Roberts, Newton, MA (US); Craig W. Stanfill, Lincoln, MA (US); Scott Studer, Georgetown, MA (US)

(73) Assignee: Ab Initio Technology LLC, Lexington, MA (US)

( * ) Notice: Subject to any disclaimer, the term of this patent is extended or adjusted under 35 U.S.C. 154(b) by 546 days.

(21) Appl. No.: 14/658,440

(22) Filed: Mar. 16, 2015

(65) Prior Publication Data

US 2015/0261694 A1   Sep. 17, 2015

Related U.S. Application Data

(60) Provisional application No. 61/953,021, filed on Mar. 14, 2014.

(51) Int. Cl.
  *G06F 17/30* (2006.01)
  *G06F 13/10* (2006.01)
  *G06Q 10/06* (2012.01)

(52) U.S. Cl.
  CPC ........ *G06F 13/10* (2013.01); *G06F 17/30477* (2013.01); *G06F 17/30569* (2013.01);
  (Continued)

(58) Field of Classification Search
  CPC ............... G06F 13/10; G06F 17/30477; G06F 17/30569; G06F 17/30589; G06F 17/30604; G06F 17/30917; G06Q 10/067
  (Continued)

(56) References Cited

U.S. PATENT DOCUMENTS 5,966,072 A   10/1999  Stanfill et al.
6,035,300 A *  3/2000  Cason ............... G06F 17/30604
(Continued)

FOREIGN PATENT DOCUMENTS

CN   1299489   2/2007
CN   1324464   7/2007
(Continued)

OTHER PUBLICATIONS

U.S. Appl. No. 13/949,761, filed Jul. 24, 2013, Mapping Entities in Data Models.
(Continued)

*Primary Examiner* — Thanh-Ha Dang
(74) *Attorney, Agent, or Firm* — Occhiuti & Rohlicek LLP

(57) ABSTRACT

One or more mappings each define a correspondence between input attributes of an input entity and output attributes of an output entity, where the input out output entities each include one or more key attributes identified as part of a unique key. Computing result information, displayed in a user interface, includes: processing instances of a first input entity to generate instances of a first output entity; determining one or more mapped input attributes of the first input entity that correspond to each of the key attributes of the first output entity; generating the instances of the first output entity based on the determined one or more mapped input attributes; computing a total number of instances of the first input entity that were processed; and computing a total number of instances of the first output entity that were generated.

49 Claims, 7 Drawing Sheets

(52) U.S. Cl.
CPC .. *G06F 17/30589* (2013.01); *G06F 17/30604* (2013.01); *G06F 17/30917* (2013.01); *G06Q 10/067* (2013.01)

(58) Field of Classification Search
USPC .......................................................... 707/607
See application file for complete search history.

(56) References Cited

U.S. PATENT DOCUMENTS

| | | | |
|---|---|---|---|
| 6,853,997 B2 | 2/2005 | Wotring et al. | |
| 7,162,469 B2 | 1/2007 | Anonsen et al. | |
| 7,359,912 B2 | 4/2008 | Trappen et al. | |
| 7,526,503 B2 | 4/2009 | Bernstein et al. | |
| 7,734,657 B2 | 6/2010 | Anonsen et al. | |
| 7,882,132 B2 | 2/2011 | Ghatare | |
| 8,046,383 B2* | 10/2011 | Weber ............... | G06F 17/30914 707/756 |
| 8,645,973 B2 | 2/2014 | Bosworth et al. | |
| 8,924,415 B2 | 12/2014 | Thomas | |
| 9,535,951 B2 | 1/2017 | Brown et al. | |
| 9,547,638 B2 | 1/2017 | Studer et al. | |
| 2004/0015496 A1* | 1/2004 | Anonsen ........... | G06F 17/30607 |
| 2005/0125432 A1* | 6/2005 | Lin ................... | G06F 17/30448 |
| 2006/0235900 A1* | 10/2006 | Anonsen ........... | G06F 17/30607 |
| 2006/0253466 A1* | 11/2006 | Upton, IV ........ | G06F 17/30392 |
| 2007/0011668 A1 | 1/2007 | Wholey et al. | |
| 2007/0106666 A1* | 5/2007 | Beckerle ........... | G06F 17/30575 |
| 2007/0226203 A1* | 9/2007 | Adya ................ | G06F 17/30418 |
| 2008/0189240 A1 | 8/2008 | Mullins et al. | |
| 2008/0228697 A1* | 9/2008 | Adya ................ | G06F 17/30595 |
| 2008/0306983 A1* | 12/2008 | Singh .................... | G06F 17/246 |
| 2009/0012983 A1 | 1/2009 | Senneville et al. | |
| 2009/0083313 A1 | 3/2009 | Stanfill et al. | |
| 2009/0144319 A1 | 6/2009 | Panwar et al. | |
| 2010/0138388 A1* | 6/2010 | Wakeling .......... | G06F 17/30569 707/634 |
| 2011/0066602 A1* | 3/2011 | Studer ................ | G06F 17/2264 707/690 |
| 2011/0179014 A1 | 7/2011 | Schechter et al. | |
| 2011/0191380 A1* | 8/2011 | Karnam ................ | G06Q 30/02 707/792 |
| 2011/0197119 A1* | 8/2011 | Ye .......................... | G06Q 30/08 715/226 |
| 2012/0059863 A1* | 3/2012 | Thomson .......... | G06F 17/30392 707/805 |
| 2012/0284255 A1 | 11/2012 | Schechter et al. | |
| 2013/0006968 A1* | 1/2013 | Gusmini ........... | G06F 17/30557 707/722 |
| 2013/0290292 A1 | 10/2013 | Weyerhaeuser et al. | |
| 2013/0290298 A1 | 10/2013 | Weyerhaeuser et al. | |
| 2014/0032617 A1 | 1/2014 | Stanfill | |
| 2015/0261694 A1 | 9/2015 | Roberts et al. | |
| 2015/0261882 A1 | 9/2015 | Roberts et al. | |

FOREIGN PATENT DOCUMENTS

| | | |
|---|---|---|
| CN | 101438280 | 5/2009 |
| JP | 2001034618 | 9/2001 |
| JP | 2005018767 | 1/2005 |
| JP | 2005327232 | 11/2005 |
| JP | 2012014739 | 1/2012 |
| JP | 6208491 | 10/2017 |
| WO | 2007/002647 A2 | 1/2007 |
| WO | 2008/124319 A1 | 10/2008 |

OTHER PUBLICATIONS

U.S. Appl. No. 14/658,357, filed Mar. 16, 2015, Mapping Attributes of Keyed Entities.

Ballard et al. "InfoSphere DataStage for Enterprise XML Data Integration" *IBM Redbooks, International Technical Support Organization*, pp. 1-404 (May 2012).

Dweib et al. "MAXDOR: Mapping XML Document into Relational Database" *The Open Information Systems Journal*, 3: 108-122 (2009).

Rull et al. "MVT: A Schema Mapping Validation Tool" *Proceedings of the International Conference on Extending Database Technology: Advances in Database Technology*, pp. 1120-1123 (Mar. 2009).

Akehurst, D. H., et al., "SiTra: Simple Transformations in Java", MoDELS 2006, LNCS 4199, Springer Verlag, Berlin, Germany, © 2006, pp. 351-364.

Microsoft Computer Dictionary, 5th Edition, Microsoft Press, Redmond, WA, © 2002, pp. 35, 145, 442-443 and 548.

* cited by examiner

MAPPING ATTRIBUTES OF KEYED ENTITIES

CROSS-REFERENCE TO RELATED APPLICATIONS

This application claims priority to U.S. Application Ser. No. 61/953,021, filed on Mar. 14, 2014, incorporated herein by reference.

BACKGROUND

This description relates to mapping attributes of keyed entities.

Various systems have the ability to map data from an input (or "origin") system or format to an output (or "destination") system or format. The mapping process may include applying a transformation function to input data and storing the results as output data, according to a mapping. A "mapping" may be defined that specifies relationships between attributes of input data and attributes of output data. The mapping process may result in the input data being loaded into a system as the output data, for example, or may result in the input data being transformed into the output data, or both. The content of the input or output data may include data values that, in some cases, represent metadata describing characteristics of other data. In some systems, mapping operations are performed in the context of Extract, Transform, and Load (ETL) processing.

SUMMARY

In one aspect, in general, a computing system includes: a data storage system storing entity data representing a plurality of entities, with each entity having one or more attributes, at least some of the entities each having multiple instances, and at least some of the instances each having respective values for one or more of the attributes, where the plurality of entities include a plurality of input entities and a plurality of output entities; an input device or port for receiving input data that includes one or more mappings that each define a correspondence between one or more input attributes of one of the input entities and one or more output attributes of one of the output entities, where the input entity includes one or more key attributes identified as part of a unique key for the input entity, and the output entity includes one or more key attributes identified as part of a unique key for the output entity; an output device or port for displaying a user interface configured to receive the input data; and at least one processor configured to compute result information displayed in the user interface, the result information characterizing a result of processing instances of the input entities to generate instances of the output entities according to the one or more mappings included in the input data. The computing includes: processing instances of a first input entity to generate instances of a first output entity; determining one or more mapped input attributes of the first input entity that correspond to each of the one or more key attributes of the first output entity, based on the one or more mappings; generating the instances of the first output entity based on the determined one or more mapped input attributes; computing a total number of instances of the first input entity that were processed; and computing a total number of instances of the first output entity that were generated.

Aspects can include one or more of the following features.

Displaying the result information in the user interface includes displaying the total number of instances of the first output entity in association with a representation of the first output entity.

Displaying the result information in the user interface includes displaying the total number of instances of the first input entity in association with a representation of the first input entity.

Displaying the result information in the user interface includes displaying multiple elements representing one or more mappings between attributes of a displayed input entity and attributes of a displayed output entity, displaying an icon for each element that indicates whether or not the input data for any mappings between the displayed input entity and displayed output entity assign an output attribute to: (1) an input attribute of the same name, or (2) a constant value.

Determining one or more mapped input attributes of the input entity that correspond to each of the one or more key attributes of the output entity includes determining whether the one or more mapped input attributes have a one-to-one correspondence with respective key attributes of the output entity.

The computing further includes comparing the mapped input attributes with the one or more key attributes of the input entity to determine whether the mapped input attributes include: (1) all of the key attributes of the input entity, or (2) fewer than all of the key attributes of the input entity.

The processing further includes generating the instances of the output entity based on: (1) a one-to-one correspondence between the instances of the output entity and instances of the input entity that have matching key attributes, in response to determining that the mapped input attributes include all of the key attributes of the input entity, or (2) an aggregation of multiple instances of the input entity that share the same values for the mapped input attributes, in response to determining that the mapped input attributes include fewer than all of the key attributes of the input entity.

The entity data represent a plurality of output entities that are related according to a hierarchy, where at least one root output entity is at a highest level of the hierarchy and one or more output entities are at one or more levels below the highest level of the hierarchy, and each output entity at a level lower than the root entity is a sub-entity of a single output entity.

The entity data represent a plurality of input entities that are related according to a hierarchy, where at least one root input entity is at a highest level of the hierarchy and one or more input entities are at one or more levels below the highest level of the hierarchy, and each input entity at a level lower than the root entity is a sub-entity of a single input entity.

At least a first entity that is not related to the plurality of output entities that are related according to a hierarchy includes at least one attribute that is referenced as an output attribute by at least one of the mappings included in the input data.

The first entity includes at least one attribute that is referenced as an input attribute by at least one of the mappings included in the input data.

A plurality of instances of a first entity that is a sub-entity of a second entity each include a common value of a key attribute of the first entity that identifies a particular instance of the second entity.

The first entity corresponds to a first set of records, the second entity corresponds to a second set of records, and the key attribute of the first entity corresponds to a foreign key field of the first set of records that identifies a value included in a primary key field of a particular record in the second set of records.

A plurality of instances of a first entity that is a sub-entity of a second entity correspond to a plurality of elements of a vector that is included within a data structure of a particular instance of the second entity.

The processing further includes generating the instances of the output entity using a dataflow graph to process the instances of the input entity to generate the instances of the output entity, the dataflow graph including nodes representing components configured to perform operations on instances of an entity, and links between nodes representing flows of instances between components.

The dataflow graph includes at least one split component that is configured to extract one or more vectors of instances of a sub-entity from a data structure of an instance of another entity based on the input attributes of the one or more mappings, and at least one combine component that is configured to insert one or more vectors of instances of a sub-entity into a data structure of an instance of another entity based on the output attributes of the one or more mappings.

In another aspect, in general, a computing system includes: means for storing entity data representing a plurality of entities, with each entity having one or more attributes, at least some of the entities each having multiple instances, and at least some of the instances each having respective values for one or more of the attributes, where the plurality of entities include a plurality of input entities and a plurality of output entities; means for receiving input data that includes one or more mappings that each define a correspondence between one or more input attributes of one of the input entities and one or more output attributes of one of the output entities, where the input entity includes one or more key attributes identified as part of a unique key for the input entity, and the output entity includes one or more key attributes identified as part of a unique key for the output entity; means for displaying a user interface configured to receive the input data; and means for computing result information displayed in the user interface, the result information characterizing a result of processing instances of the input entities to generate instances of the output entities according to the one or more mappings included in the input data. The computing includes: processing instances of a first input entity to generate instances of a first output entity; determining one or more mapped input attributes of the first input entity that correspond to each of the one or more key attributes of the first output entity, based on the one or more mappings; generating the instances of the first output entity based on the determined one or more mapped input attributes; computing a total number of instances of the first input entity that were processed; and computing a total number of instances of the first output entity that were generated.

In another aspect, in general, a method for processing data in a computing system includes: storing, in a data storage system, entity data representing a plurality of entities, with each entity having one or more attributes, at least some of the entities each having multiple instances, and at least some of the instances each having respective values for one or more of the attributes, where the plurality of entities include a plurality of input entities and a plurality of output entities; receiving, over an input device or port, input data that includes one or more mappings that each define a correspondence between one or more input attributes of one of the input entities and one or more output attributes of one of the output entities, where the input entity includes one or more key attributes identified as part of a unique key for the input entity, and the output entity includes one or more key attributes identified as part of a unique key for the output entity; displaying, over an output device or port, a user interface configured to receive the input data; and computing, with at least one processor, result information displayed in the user interface, the result information characterizing a result of processing instances of the input entities to generate instances of the output entities according to the one or more mappings included in the input data. The computing includes: processing instances of a first input entity to generate instances of a first output entity; determining one or more mapped input attributes of the first input entity that correspond to each of the one or more key attributes of the first output entity, based on the one or more mappings; generating the instances of the first output entity based on the determined one or more mapped input attributes; computing a total number of instances of the first input entity that were processed; and computing a total number of instances of the first output entity that were generated.

In another aspect, in general, software is stored in non-transitory form on a computer-readable medium, the software including instructions for causing a computing system to: store, in a data storage system, entity data representing a plurality of entities, with each entity having one or more attributes, at least some of the entities each having multiple instances, and at least some of the instances each having respective values for one or more of the attributes, where the plurality of entities include a plurality of input entities and a plurality of output entities; receive, over an input device or port, input data that includes one or more mappings that each define a correspondence between one or more input attributes of one of the input entities and one or more output attributes of one of the output entities, where the input entity includes one or more key attributes identified as part of a unique key for the input entity, and the output entity includes one or more key attributes identified as part of a unique key for the output entity; display, over an output device or port, a user interface configured to receive the input data; and compute, with at least one processor, result information displayed in the user interface, the result information characterizing a result of processing instances of the input entities to generate instances of the output entities according to the one or more mappings included in the input data. The computing includes: processing instances of a first input entity to generate instances of a first output entity; determining one or more mapped input attributes of the first input entity that correspond to each of the one or more key attributes of the first output entity, based on the one or more mappings; generating the instances of the first output entity based on the determined one or more mapped input attributes; computing a total number of instances of the first input entity that were processed; and computing a total number of instances of the first output entity that were generated.

Aspects can include one or more of the following advantages.

The mapping techniques enable flexibility in mapping input data to output data, while preserving certain characteristics for identifying unique instances of particular entities that exist within the input data and output data. The input or output data may include "entity data" that represents one or more entities. An entity can be regarded as an abstraction of a collection of any number of items of a particular kind, in an information domain, which are capable of independent existence or can be uniquely identified. For example, an "Accounts" entity may be represented by a table in a database, or by a dataset stored as a file (e.g., with delimited records). Individual records (or "rows") in the database table or dataset file may each represent a different instance of the Accounts entity for a particular account holder, for example, in a system that manages financial or commercial data. An entity can also be represented by any other type of data structure such as a collection of data objects of a particular class, where different instances of the entity correspond to different instances of the data object. Each entity may have any number of attributes. For example, in an entity represented by a database table, the fields (or "columns") of the table can be defined for storing a particular type of data (e.g., a variable with a predetermined data type) corresponding to a particular attribute of that entity. A table for an Accounts entity, for example, may include fields labeled "first_name," "last_name," and "SSN" (for social security number), and records in the table (representing instances of the Accounts entity) can each have respective values for each of the fields.

To ensure that different instances of an entity can be uniquely identified, one or more attributes of the entity are identified as "key attributes" that are part of a unique key for the entity. In some cases, an entity has a single key attribute. For example, a field labeled "master_account_number" may store a value that is unique for each account record that represents an instance of the Accounts entity. Such a single key field is sometimes called a "simple key." In some cases, an entity has multiple key attributes that together form a unique key (also called a "compound key"). For example, the combination (e.g., concatenation) of the fields "first_name," "last_name," and "SSN" may act as key attributes that together uniquely identify a record that represents an instance of the Accounts entity. There may be multiple fields with unique values (also called "candidate keys"), and one of those fields (or a combination of fields) may be selected for use as the unique key that will be used (also called a "primary key"). Sometimes a field is added to a record to store a value that will act as part of a unique key (also called a "surrogate key").

A problem that may arise for a user attempting to process certain data in a data processing system is that the processing may require certain fields as key attributes (e.g., last_name, zip_code for data organized by household), but the existing data may have other fields as key attributes (e.g., first_name, last_name, zip_code for data organized by individuals). However, key fields cannot be changed without ensuring that the data actually has the correct properties (i.e., that there is a single record for each unique value of the key). Such reorganization may not be practical for a user to perform in a realistic industrial application in which there may be thousands or millions of records. The techniques described herein enable the processing to be carried out efficiently even when a key change is required without requiring the user to reorganize the input data record-by-record (or to write a program from scratch to do so). For example, the techniques ensure that any aggregation that might be needed in certain circumstances (e.g., aggregating data from multiple individuals for a particular household) will be applied using the desired fields as key attributes. The result of processing the input data to reorganize the records can then be displayed within a user interface in the form of total numbers of input and output records.

The structure of the entity data representing a particular entity and its attributes can be defined by format information, such as a record format for a database table or dataset file that defines the fields within a record. In addition to the data types and byte lengths of the values to appear in each field, a record format may define which fields are to be used as key fields that make up the primary key. The mapping procedures enable a user to be able to define which attributes of an output entity are to be the key attributes. Some of those output key attributes may have been mapped to input key attributes, or some of those output key attributes may have been mapped to non-key attributes of the input entity. By automatically comparing input attributes that have been mapped to those output key attributes with the input key attributes, the system is able to determine how to generate instances of the output entity according to the mapping in a way that maintains well-defined key attributes capable of uniquely identifying the instances of the output entities. The mapping of input entities represented by the input data to output entities represented by the output data may enable the mapped output data to be processed and/or managed more efficiently than the input data. In some cases, the entity data for multiple related entities may define a hierarchical relationship among the instances of the entities, as described in more detail below. The mapping procedures are able to reorganize such hierarchies and ensure that the entities still maintain well-defined key attributes.

Other features and advantages of the invention will become apparent from the following description, and from the claims.

DESCRIPTION

Figure 1:
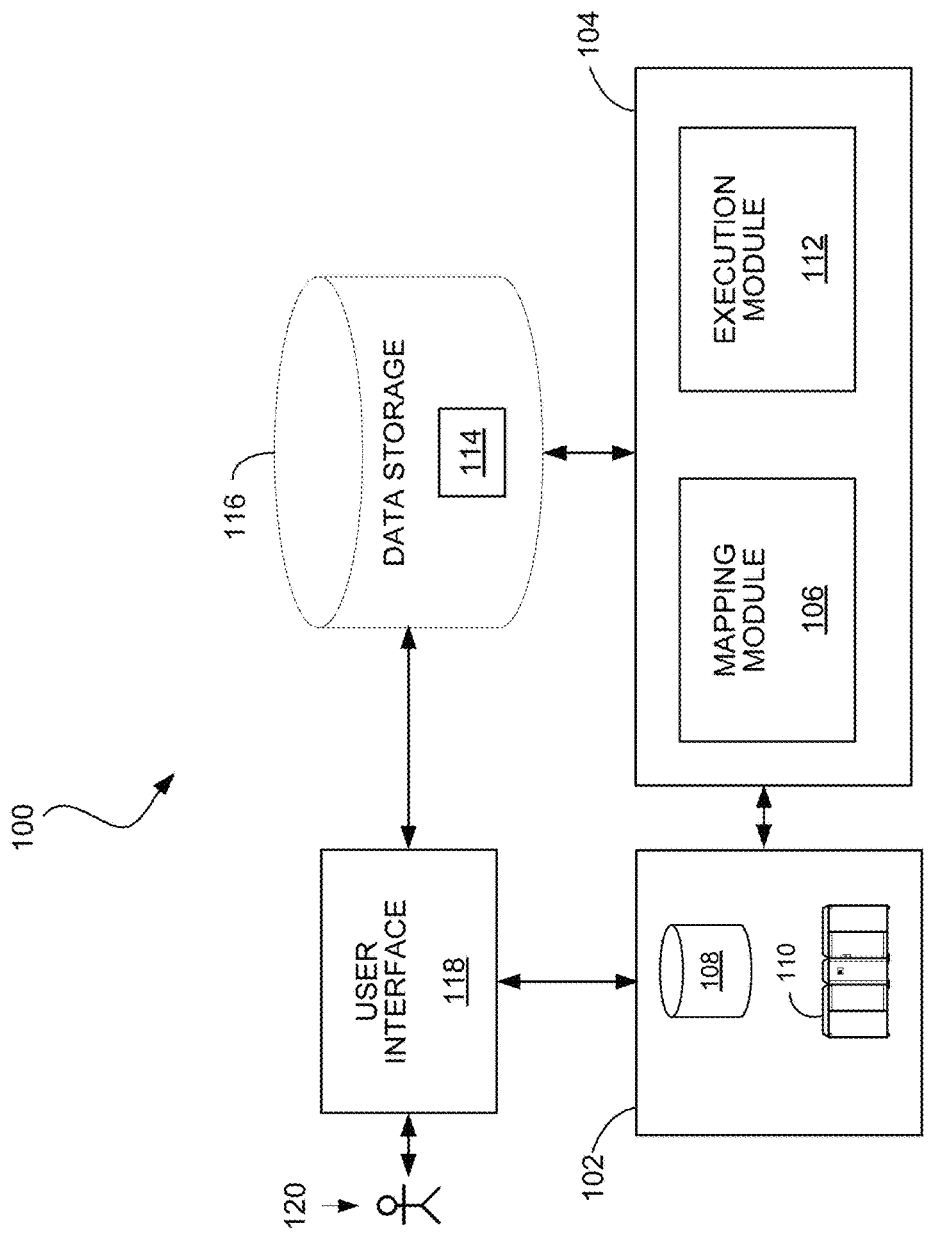
FIG. 1 is a block diagram of a data processing system.

FIG. 1A shows an example of a data processing system 100 in which the mapping techniques can be used. The system 100 includes a data management system 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a mapping module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The mapping module 106 is configured to read input data from the data management system 102 and map entities of the input data to entities of output data, based on one or more mappings 114 stored in a data storage system 116 accessible to the execution environment 104. The mappings 114 each define a correspondence between one or more input attributes of an input entity and one or more output attributes of an output entity. For example, the correspondence can be an equality between two attributes, or an expression that defines one attribute as a function of another attribute. The output data may be stored back in the data management system 102 or in the data storage system 116, or otherwise used. The data storage system 116 may include any combination of storage media, including volatile storage media such as any level of cache memory, or main memory in a dynamic random access memory (DRAM), or non-volatile storage such as magnetic hard disk drive(s). Storage devices providing the data management system 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The execution module 112 uses the output data generated by the mapping module 106 to perform data processing tasks, some of which may rely on the data format of the output data that has been defined by the mappings 114. The system 100 also includes a user interface 118 (e.g., a graphical user interface displayed on a screen of a display of a computer in communication with or hosting the execution environment 104) in which a user 120 is able to define the mappings 114, and other aspects of a data processing program to be executed by the execution module 112. The system 100, in some implementations, is configured for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The mapping module 106 can map attributes of a variety of types of entities that may be represented within input data accessible from the data management system 102, including dataset files or database tables, for example. The data content of the entity may be organized as records having values for respective attributes (also called "fields" or "columns"), including possibly null values. The mapping module 106 typically starts with some initial format information about records in that entity. In some circumstances, the record structure of the entities in the input data may not be known initially and may instead be determined after analysis of the input data. The initial information about records can include, for example, the number of bits that represent a distinct value, the order of fields within a record, and the type of value (e.g., string, signed/unsigned integer) represented by the bits.

For some input data or output data, the entities may have a hierarchical structure, where the entities are related to each other according to a hierarchy. In general, the hierarchy can be represented as a graph of vertices connected by directed edges (e.g., a directed acyclic graph (DAG)), where the vertices represent entities, and the edges represent relationships between the entities. In some implementations, the relationship corresponds to a primary key/foreign key relationship between the entities. In other implementations, the relationship corresponds to a nesting of an instance of one entity within an attribute of an instance of another entity. Each vertex is at a particular level of the hierarchy. At least one entity (e.g., a root entity if the hierarchy has a tree structure) is at a highest level of the hierarchy, and one or more entities are at one or more levels below the highest level of the hierarchy. Each entity at a level lower than the highest level is a sub-entity (or "child entity") of a single higher-level entity (or "parent entity"). For example, when the relationships are primary key/foreign key relationships, an instance of the child entity has a foreign key field whose value is the unique primary key value of a particular instance of the parent entity. When the relationships are nesting relationships, an instance of the child entity is contained within an attribute of a particular instance of the parent entity (e.g., by storing the child instance data structure itself, or a pointer to the child instance data structure within the parent instance's attribute).

Figure 2A:
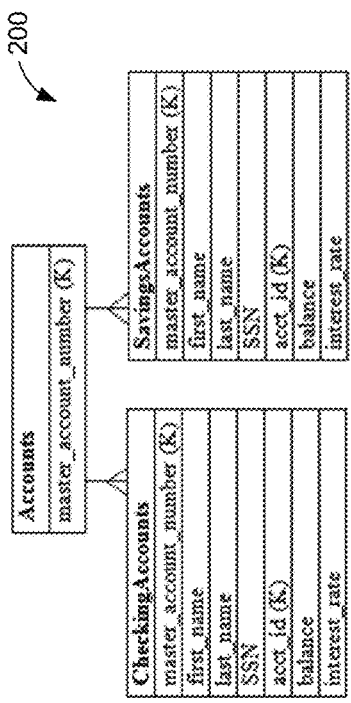
FIGS. 2A-2B are entity-relationship diagrams.

Such a hierarchical structure can be represented graphically in an entity-relationship (ER) diagram. FIG. 2A shows an ER diagram for an example of an input hierarchy 200 of entities, which has a tree structure. At the highest level, an "Accounts" entity has a single attribute labeled "master_account_number," which is a key attribute, as indicated by a "(K)" after the attribute label. Since there are no other key attributes for the Accounts entity, the value of the master_account_number uniquely identifies different instances of the Accounts entity. The Accounts entity also has attributes for relationships to two child entities: a "CheckingAccounts" entity, and a "SavingsAccounts" entity. The connectors in the diagram 200 between the parent entity and each child entity indicate one-to-many relationship, which means that for one instance of the parent entity, there are zero, one, or many related instances of the child entity. This one-to-many relationship is depicted as a line between the parent entity and the child entity, ending with a crow's foot at the child entity.

The CheckingAccounts entity has two key attributes: an attribute labeled "master_account_number" and an attribute labeled "acct_id." The master_account_number attribute is a foreign key, which stores a particular value of the primary key of a related instance of the parent Accounts entity. The acct_id attribute is an additional key attribute that forms a compound key that uniquely distinguishes different checking accounts from each other, even if they are children of the same master account instance of the Accounts entity (e.g., if an account holder associated with a particular master account has multiple checking accounts). Similarly, the SavingsAccounts entity has two key attributes: an attribute labeled "master_account_number" and an attribute labeled "acct_id," which also enable any number of savings accounts to be uniquely distinguished from each other. Each of the CheckingAccounts and SavingsAccounts entities also has other attributes that are non-key attributes for these entities: "first_name," "last_name," "SSN," "balance," and "interest_rate."

Figure 2B:
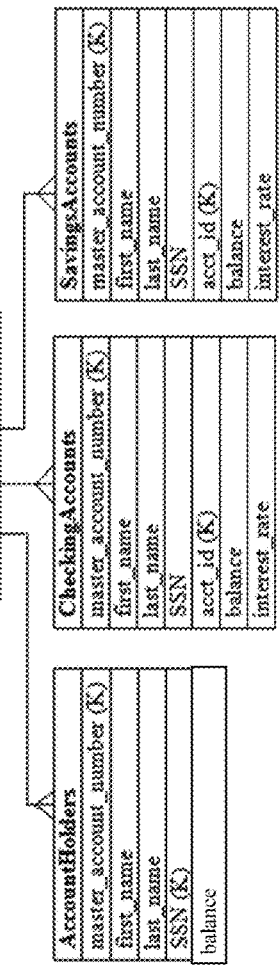

FIG. 2B shows an ER diagram for an example of an output hierarchy 210 of entities, which also has a tree structure, but a different number of entities from the input hierarchy 200. The mapping module 106 has received a mapping (e.g., from a user), which specifies an "AccountHolders" output entity to be generated as part of the output hierarchy 210. In this example, the other output entities that are part of the output hierarchy 210 (i.e., top-level entity Accounts, and its child entities CheckingAccounts and SavingsAccounts) are mapped from corresponding labeled entities found in the input hierarchy 200. The AccountHolders entity has instances with attributes for each account holder that is derived from one or more instances of the CheckingAccounts entity and/or one or more instances of the SavingsAccounts entity. In particular, four of the attributes of an instance of the AccountHolders entity ("master_account_number," "first_name," "last_name," and "SSN") are derived from corresponding labeled attributes of an instance of one of the CheckingAccounts or SavingsAccounts entities, and one of the attributes of an instance of the AccountHolders entity ("balance") is computed based on an aggregation function over multiple instances, as described in more detail below. The AccountHolders entity has two key attributes: master_account_number, and SSN. The master_account_number attribute is still a foreign key, which stores a particular value of the primary key of a related instance of the parent Accounts entity. The SSN attribute (storing the social security number of the account holder) is an additional key attribute that forms a compound key that uniquely distinguishes different account holders (i.e., instances of the AccountHolders entity) from each other, even if they are children of the same master account instance of the Accounts entity.

Figure 3A:
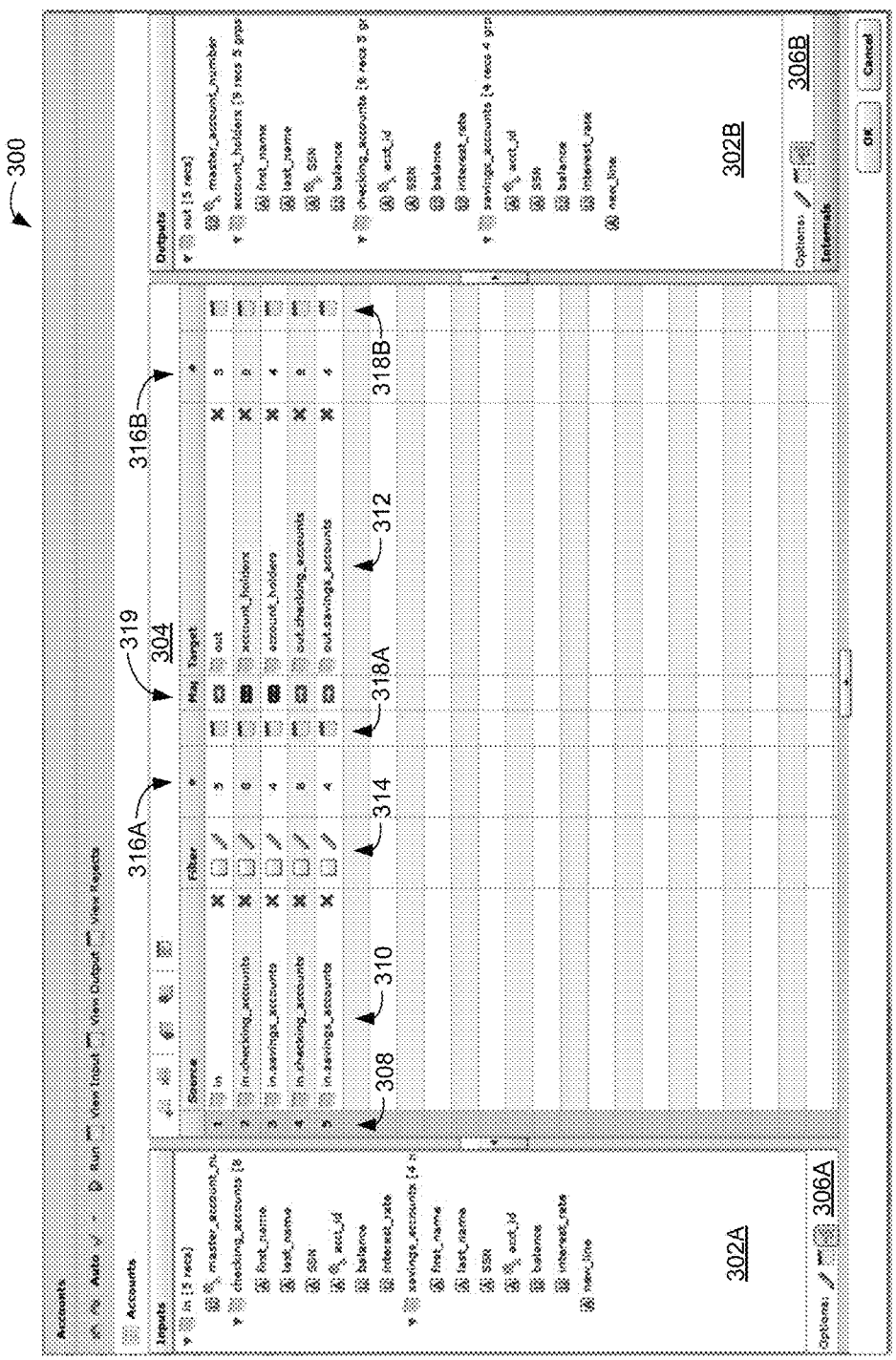
FIGS. 3A-3D are screenshots of examples of portions of a user interface.

FIG. 3A shows a screenshot of an example of a user interface 300 for defining an output hierarchy displayed in an Outputs section 302B in terms of an input hierarchy displayed in an Inputs section 302A. The state of the user interface 300 shown in the screenshot corresponds to an example in which a user has supplied information defining the desired mappings 114 within a Source-to-Target mappings section 304, and executed the conversion to generate records of the output hierarchy from records of the input hierarchy. The input hierarchy is displayed according to stored format information, such as a record format defined in terms of a syntax that can be interpreted by the system 100 (e.g., a Data Manipulation Language (DML) syntax, or an Extensible Markup Language (XML) syntax), or a database table schema. The following is an example of a record format that specifies the input hierarchy in this example using a DML syntax that defines input attributes as fields of an input record.

```
record
    decimal(",") master_account_number;
    record
        string(",") first_name;
        string(",") last_name;
        string(",") SSN;
        string(",") acct_id;
        decimal(",") balance;
        decimal(",") interest_rate;
    end[decimal(4)] checking_accounts;
    record
        string(",") first_name;
```

-continued

```
        string(",") last_name;
        string(",") SSN;
        string(",") acct_id;
        decimal(",") balance;
        decimal(",") interest_rate;
    end[decimal(4)] savings_accounts;
    string("\n") new_line= "\n";
end;
```

An outer pair of "record" and "end" keywords define a record representing a top-level ("in") entity. The inner pairs of "record" and "end" keywords define records representing the child (checking_accounts and savings_accounts) entities. Fields representing the attributes of the entities are listed between the "record" and "end" keywords. The record format may define fields to be included in records for storing values that are not necessarily part of the high level entity being represented by that record. In this example, the new_line field appears after the checking_accounts and savings_accounts records in the record format, and is not used as an attribute of the "in" entity, but rather as a syntax element to provide a hard coded new line character between different actual records representing instances of the "in" entity in a listing displayed in a text editor, for example.

The mapping module 106 generates the appropriate record format to be used for the records representing instances of the "out" entity, according to the mappings 114 defined within the Source-to-Target mappings section 304. The following is an example of a record format that specifies the output hierarchy in this example using the same DML syntax that defines output attributes as fields of an output record.

```
record
    decimal(",") master_account_number;
    record
        string(",") first_name;
        string(",") last_name;
        string(",") SSN;
        decimal(",") balance;
    end[decimal(4)] account_holders;
    record
        string(",") acct_id;
        string(",") SSN;
        decimal(",") balance;
        decimal(",") interest_rate;
    end[decimal(4)] checking_accounts;
    record
        string(",") acct_id;
        string(",") SSN;
        decimal(",") balance;
        decimal(",") interest_rate;
    end[decimal(4)] savings_accounts;
    string("\n") new_line= "\n";
end;
```

This output record format is generated after the user provides mappings for the attributes of various entities in the output hierarchy, and the user is able to identify (e.g., within the Outputs section 302B) which of the attributes of each output entity are to be used as key attributes. This information about which attributes of the output entities are key attributes, and information about which attributes of the input entities have been mapped to those key attributes (called the "inverse image" of the output key) are used to generate a dataflow graph, which is then executed to generate the actual records representing instances of the entities of the output hierarchy, as described in more detail below.

The displayed user interface 300 includes an icon (depicting a table) representing the top-level entity of the input hierarchy at the top of the Inputs section 302A labeled "in," and an icon (depicting a table) representing the top-level entity of the output hierarchy at the top of the Outputs section 302B labeled "out." The number of instances of each entity is displayed next to the label in square brackets. For example, after the records of the output hierarchy are generated, "[5 recs]" is displayed for both top-level entities, indicating that there are 5 records storing the content of different respective instances of that entity. In this example, the top-level input entity and output entity correspond to the Accounts entities of the ER diagram of FIGS. 2A and 2B, respectively. Each of these top-level entities includes fields representing the same attributes and sub-entities as shown in the ER diagram, including field representing a key attribute master_account_number displayed after an icon appearing just under the icon for the top-level entity. The fields corresponding to the attributes are displayed with icons depicting the letter "A," which indicates that it appears in the records as a value having a "string" type, or with icons depicting the numbers "12," which indicates that it appears in the records as a value having a "decimal" type. In the user interface 300, each field that is part of a key (i.e., a key attribute) is identified within the user interface 300 by an icon depicting a key appearing next to the field's icon.

The user interface 300 enables the Inputs section 302A and the Outputs section 302B to be viewed in different view modes, which are selectable in an Options section 306A and an Options section 306B, respectively. In a "hierarchy view mode," the table icons for sub-entities of a parent entity are displayed indented by the same amount as the attributes of that parent entity, and key attributes that refer to a key attribute of a parent entity are not shown in the child entity. FIG. 3A shows both the Inputs section 302A and the Outputs section 302B in the hierarchy view mode. For the Inputs section 302A, the table icons for the checking_accounts entity and the savings_accounts entity appear below, and horizontally aligned with, the icon for the master_account_number key attribute. For the Outputs section 302B, the table icons for the account_holders entity and the checking_accounts entity and the savings_accounts entity appear below, and horizontally aligned with, the icon for the master_account_number key attribute.

Each entity that has at least one sub-entity has a key made up of one or more key attributes. This enables each sub-entity to have a corresponding foreign-key attribute that identifies, for each instance of the sub-entity, a unique instance of the parent entity related to that sub-entity. The existence of a key attribute that stores the (foreign key) value of a key of a parent entity is implicit in the hierarchy view mode, which does not display such attributes. For example, for both the input hierarchy and the output hierarchy, the checking_accounts sub-entity has a key attribute acct_id with a key icon, and another key attribute that stores a value of a master_account_number key attribute of the parent "in" or "out" top-level entity, together forming a compound key. In the hierarchy view mode, the table icons are displayed with a triangle for expanding or collapsing that entity to show or hide its attributes and sub-entities (if any).

Figure 3B:
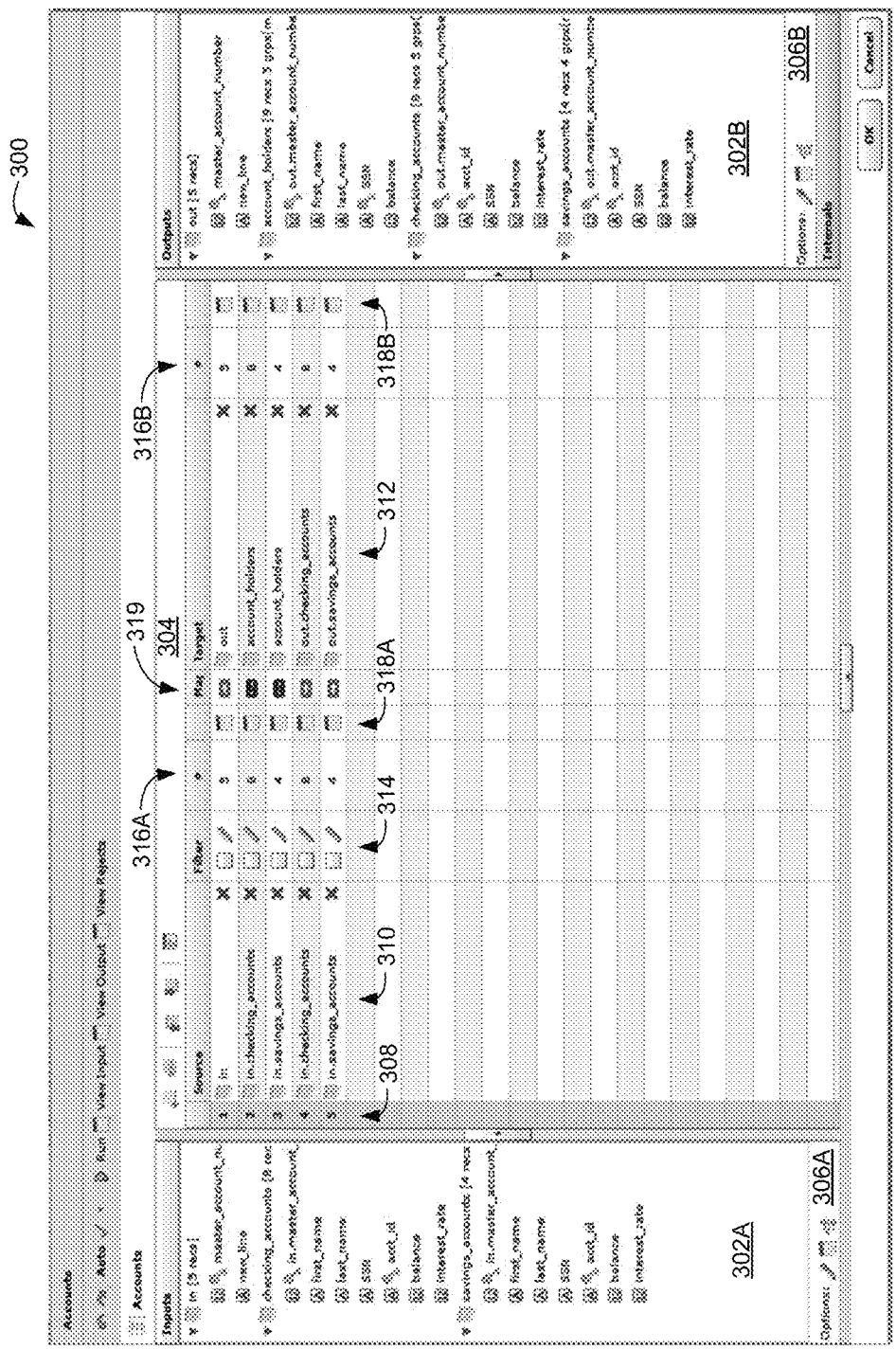

In an "entity view mode," the table icons for entities at different levels of the hierarchy are displayed indented by the same amount as each other, and key attributes that refer to a key attribute of a parent entity are shown in the child entity. FIG. 3B shows both the Inputs section 302A and the Outputs section 302B in the entity view mode. For the Inputs section 302A the table icons for the checking_accounts entity and the savings_accounts entity appear below, and horizontally aligned with, the icon for the "in" entity. For the Outputs section 302B, the table icons for the account_holders entity and the checking_accounts entity and the savings_accounts entity appear below, and horizontally aligned with, the icon for the "out" entity. In the entity view mode, the existence of the key attribute that stores the (foreign key) value of a key of a parent entity is explicitly shown (e.g., fields named "in.master_account_number" and "out.master_account_number"). In the entity view mode, the table icons are displayed with a triangle for expanding or collapsing that entity to show or hide its attributes, but any sub-entities are independently expanded/collapsed.

As shown in both FIGS. 3A and 3B, the Source-to-Target mappings section 304 includes lines, labeled by line numbers 308, for defining mappings between a Source and a Target. The mappings can be entered in any order, and a user can optionally use some lines to provide comments to describe the types of mappings being defined. As part of defining a mapping, a user indicates which attributes in entities of the output hierarchy are to be key attributes for uniquely identifying different instances of the entities. The mapping module 106 determines, based on this indication of key attributes, which mappings are "mappings" and which mappings are "aggregated mappings," as described in more detail below. For straight mappings, there is a default one-to-one relationship between an instance of an entity in the input hierarchy and an instance of a corresponding entity in the output hierarchy. However, there is not necessarily always a one-to-one relationship if, for example, some instances of an input entity are filtered out so that they do not appear as an instance of the corresponding output entity, and the corresponding entities do not necessarily have all of the same attributes or sub-entities, as described in more detail below. For an aggregated mapping, the execution module 112 will perform one or more aggregation operations, as specified by the mapping module 106, in the process of generating instances of the output entity in terms of input entities and/or temporary entities, as described in more detail below. For aggregated mappings, there is generally not a one-to-one relationship between an instance of an entity in the input hierarchy and an instance of a corresponding entity in the output hierarchy.

The Source-to-Target mappings section 304 includes a source column 310 for a user to identify an input entity from the input hierarchy or a temporary entity as a Source, and a target column 312 for a user to identify an output entity from the output hierarchy or a temporary entity as a Target. A temporary entity, for example, may be one that has been defined as a Target, but is not included within the output hierarchy. There is a filter column 314 that enables a user to define an optional filter that applies a filtering function that identifies certain records of a Source to be filtered out and not passed along as a record of a mapped Target. There are record count columns 316A and 316B, which provide a number of records corresponding to instances of each Source and Target entity, respectively. There are view columns 318A and 318B, which provide icons that a user can interact with to navigate to a view of the instances (i.e., records) of the corresponding Source or Target entity, respectively.

Figure 3C:
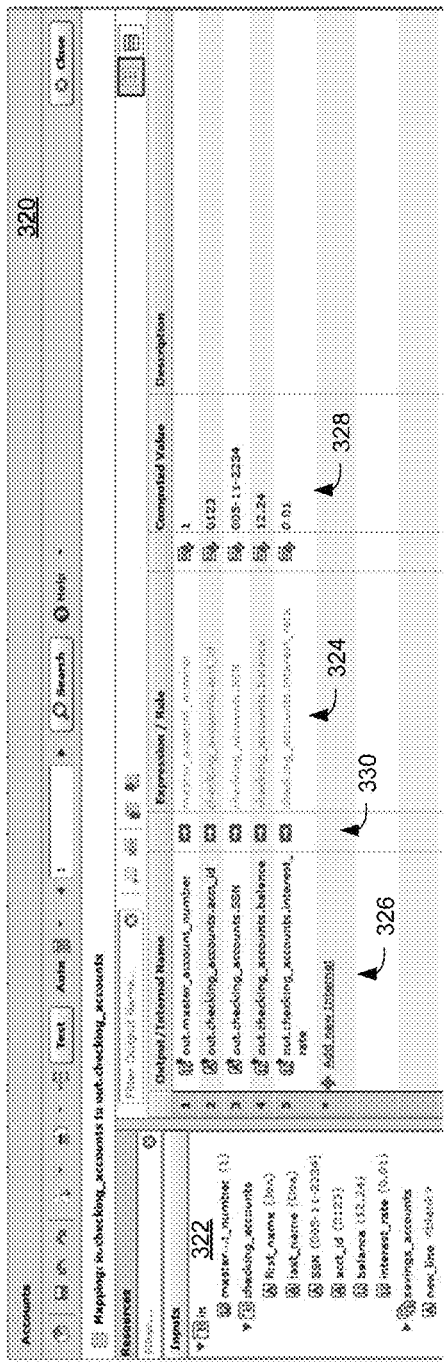
Figure 3D:
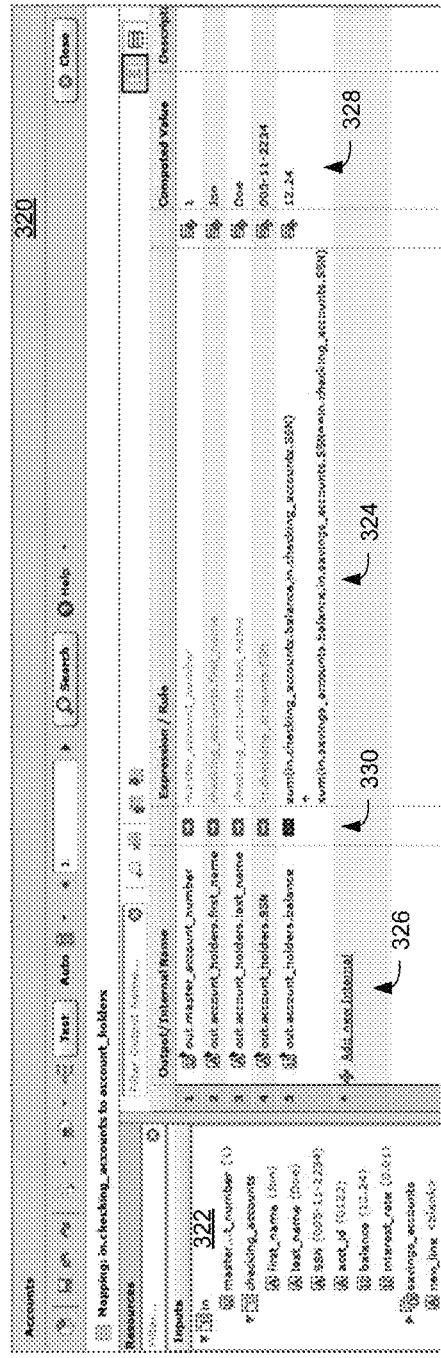

FIGS. 3C and 3D show screenshots of examples of a user interface 320 for defining a mapping between a Source and Target identified on a particular line of the Source-to-Target mappings section 304. A user is able to navigate to this user interface 320, for example, by selecting an icon of a mapping column 319 for a particular line. In FIG. 3C, the screenshot shows a mapping from "in.checking_accounts" to "out.checking_accounts" (for line 4 of the Source-to-Target mappings section 304). Dot notation is used in certain contexts to explicitly indicate the entity to which an attribute or sub-entity belongs, with the entity name as a prefix. In some contexts, if there is no ambiguity about the entity to which an attribute or sub-entity belongs, the name of that attribute or sub-entity may be displayed (or received as input) without a prefix. An Inputs section 322 lists the entities and their attributes available as inputs to be used in expressions entered by a user into an Expression/Rule column 324. An Output/Internal Name column 326 includes, on separate lines, each attribute of the output entity out.checking_accounts that is being computed by a respective expression in the Expression/Rule column 324. This example includes 5 attributes of an instance of the output entity out.checking_accounts that are being defined as having the same value as a corresponding instance of the input entity in.checking_accounts. In particular, the following attributes are defined: out.master_account_number (a foreign key referencing the value of the corresponding attribute of the parent entity "out"), out.checking_accounts.acct_id, out.checking_accounts.SSN, out.checking_accounts.balance, and out.checking_accounts.interest_rate. The corresponding attributes of the in.checking_accounts entity are listed alone in the Expression/Rule column 324 (no preceding "in." prefix is needed for these attribute names, which are assumed to be from the input hierarchy). That leaves two other attributes of the in.checking_accounts entity that are not defined as corresponding attributes of the out.checking_accounts entity in this particular example: checking_accounts.first_name, and checking_accounts.last_name. The user interface 320 also includes a Computed Value column 328 that shows a value of the corresponding output attribute defined on each line. Values of the input attributes from which those output attributes are computed are also shown in the Inputs section 322, in parentheses after the name of the field representing that attribute. A type column 330 shows an icon that indicates whether the mapping defined on that line is a "simple mapping" (with an arrow icon) or a "complex mapping" (with a dotted icon). A simple mapping is one that maps an output attribute to an input attribute of the same name, or assigns the output attribute a constant value. All other mappings are complex mappings. The mapping column 319 for a line of the user interface 300 has the simple mapping icon if all of the mappings defined in its corresponding user interface 320 are simple mappings, and has the complex mapping icon if any of the mappings defined in its corresponding user interface 320 are complex mappings.

In FIG. 3D, the screenshot shows a mapping from "in.checking_accounts" to "account_holders" (for line 2 of the Source-to-Target mappings section 304). The Output/Internal Name column 326 for this mapping includes, on separate lines, each attribute of the output entity out.account_holders that is being computed by a respective expression in the Expression/Rule column 324. This example includes five attributes of the output entity out.account_holders that are being defined. Four of the five attributes are simple mappings with attributes of instances of the output entity defined in terms of corresponding attributes (i.e., with the same field name) of instances of the input entity. One of the five attributes is a complex mapping that defines the attribute out.account_holders.balance (for instances of the out.account_holders entity) in terms of attributes of instances of potentially multiple input entities. In this example, the expression in the Expression/Rule column 324 for out.account_holders.balance is as follows.

sum(in.checking_accounts.balance,in.checking_accounts.SSN)+sum(in.savings_accounts.balance, in.savings_accounts.SSN==in.checking_accounts.SSN)

This expression defines an aggregation operation that is to be performed when the execution module 112 generates instances of the output entities of the output hierarchy. The aggregation operation is a sum that is defined using a sum function that has the following syntax: sum(<aggregation_attr>,<match_attr>==<key_attr>). The first argument to this function "<aggregation_attr>" is the attribute that is to be the summand in the sum. The summation occurs over multiple instances of the argument entity or entities (i.e., any entity whose attribute is provided as an argument <aggregation_attr>). The second argument to this function "<match_attr>==<key_attr>" is itself an expression that indicates the condition that must be met in order for the first summand argument to be included in the sum. The key attribute <key_attr> is a key attribute of the input entity being used in the mapping, and the attribute <match_attr> is the "match attribute" of the argument entity that is to be matched to that key attribute. This sum function has the optional syntax that allows the attribute <match_attr> to be listed alone in the special case in which it is the same as the <key_attr>. Of course, the user can enter the expression in the reversed order "<key_attr>==<match_attr>", with the same effect. So, for the expression above, the aggregation being performed finds the values of the "balance" attribute of all instances of either the in.checking_accounts entity or the in.savings_accounts entity and adds them together if the SSN attribute of their respective instances are the same. This yields one summed total result for each unique value of SSN to be assigned to the out.account_holders.balance attribute of an instance of the out.account_holders entity that has that value of SSN as its out.account_holders.SSN attribute.

In this example, the result of the execution module 112 generating instances of the output entities of the output hierarchy yields 9 out.account_holders records, indicating that the aggregation operation found 9 unique values of the SSN attribute among the 8 in.checking_accounts records and the 4 savings accounts records that were found among the 5 top-level "in" records. The number of records generated as a result of performing the mappings defined by the user is displayed within the Outputs section 302B, which provides valuable feedback to help the user determine whether the number of records generated were as expected, and verify that the expressions entered were correct. In addition to total numbers of records for each entity, various hierarchy statistics (e.g., minimum and maximum values) can be computed and displayed in the user interface 300 for both the input hierarchy and the output hierarchy. If filters are used, the number of records rejected and/or allowed by the filter can be displayed.

In some implementations, the user interface 320 can start with a default mapping between fields in an input entity and fields in an output entity that is automatically generated based on analysis of similarities between names associated with the fields (e.g., business names, technical names), and/or analysis among key fields. Users can determine which, if any, of the default mappings to accept, or can turn off the automatic mapping feature. The automatic mapping feature can save the user from having to manually provide mappings for all of the fields, an instead focus on providing mappings for certain fields of interest.

Figure 4:
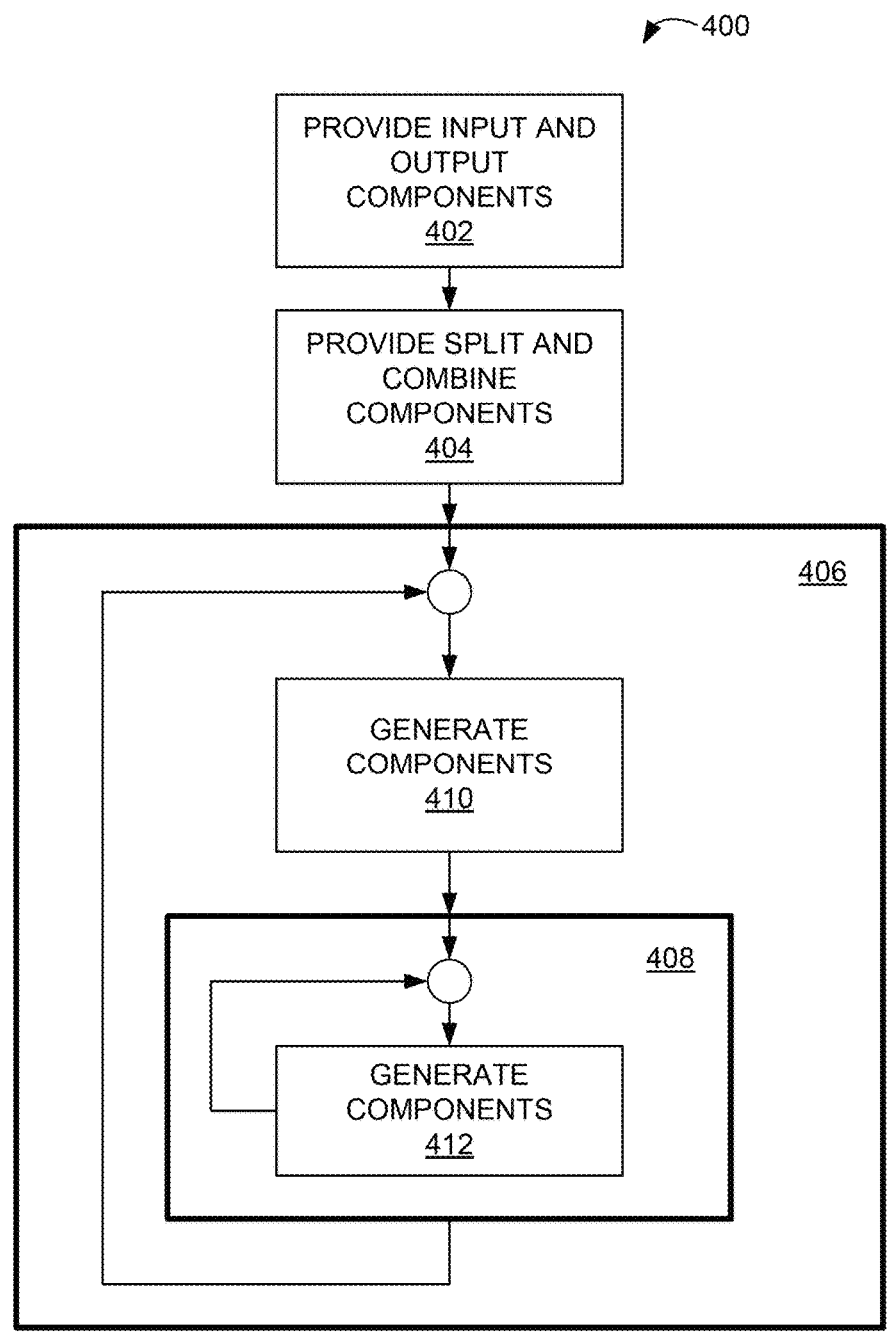
FIG. 4 is a flowchart of a procedure for generating dataflow graphs.

In some implementations, the execution module 112 executes a dataflow graph generated by the mapping module 106 to process input records (i.e., instances of the input entities of the input hierarchy) to generate the output records (i.e., instances of the output entities of the output hierarchy). FIG. 4 shows an example of a procedure 400 used by the mapping module 106 to automatically generate such dataflow graphs. The procedure 400 includes different steps involved with constructing a dataflow graph, which area explained in greater detail below in a description of generating an example dataflow graph 500 shown in FIG. 5. Other examples of the procedure 400 may perform the same steps in a different order, may use a different looping arrangement, or may include different steps that construct dataflow graphs (or their equivalent) in a different order.

The procedure 400 includes a step (402) of providing an input component representing an input dataset storing the records that represent instances of the entities in the input hierarchy, and an output component representing an output dataset storing the records that represent instances of the entities in the output hierarchy. The procedure 400 also includes a step (404) of providing a split component coupled to the input component and a combine component coupled to the output component. The split component is configured to extract any records (or other vector data structures) representing instances of sub-entities embedded within a data structure of an instance of another entity. The mapping module 106 configures the split component based on the input attributes of the mappings. So, at least some of the output ports of the split component provide a flow of records representing instances of an input entity used as a source in one of the mappings. Any records nested within other records are extracted, so that a record representing an instance of a lower-level entity is removed from its parent record, and a record representing an instance of a higher-level entity does not include any embedded child records. The combine component is configured to perform the reverse process of the split component by inserting any records representing instances of a sub-entity into a data structure of an instance of a higher-level entity. The mapping module 106 configures the combine component based on the output attributes of the mappings.

The procedure 400 has an outer loop 406 over which the inputs to the combine component are processed, and an inner loop 408 over which the outputs of the split component are processed. The loop condition 410 for the outer loop 406 determines if there are any further input ports for the combine component that need to be processed, where the number of input ports is typically based on the number of output entities being generated for the highest level of the output hierarchy just under the root level. In the outer loop 406, the mapping module 106 generates (410) any components of the dataflow graph that are needed regardless of the number of outputs of the split component are to used as inputs for mapping each output entity. In the inner loop 408, the mapping module 106 generates (412) any components of the dataflow graph that are needed to perform various computations for each output of the split component, which serve as inputs to the mappings. As described above, for each mapping for which the mapped input attributes (i.e., those mapped to key attributes of the output entity) include fewer than all of the key attributes of the input entity, at least one component performs an aggregation operation to aggregate multiple instances of the input entity that share the same values for the mapped input attributes. Other components may also be included as needed depending on the characteristics of the input attributes of records provided by the split component.

Figure 5:
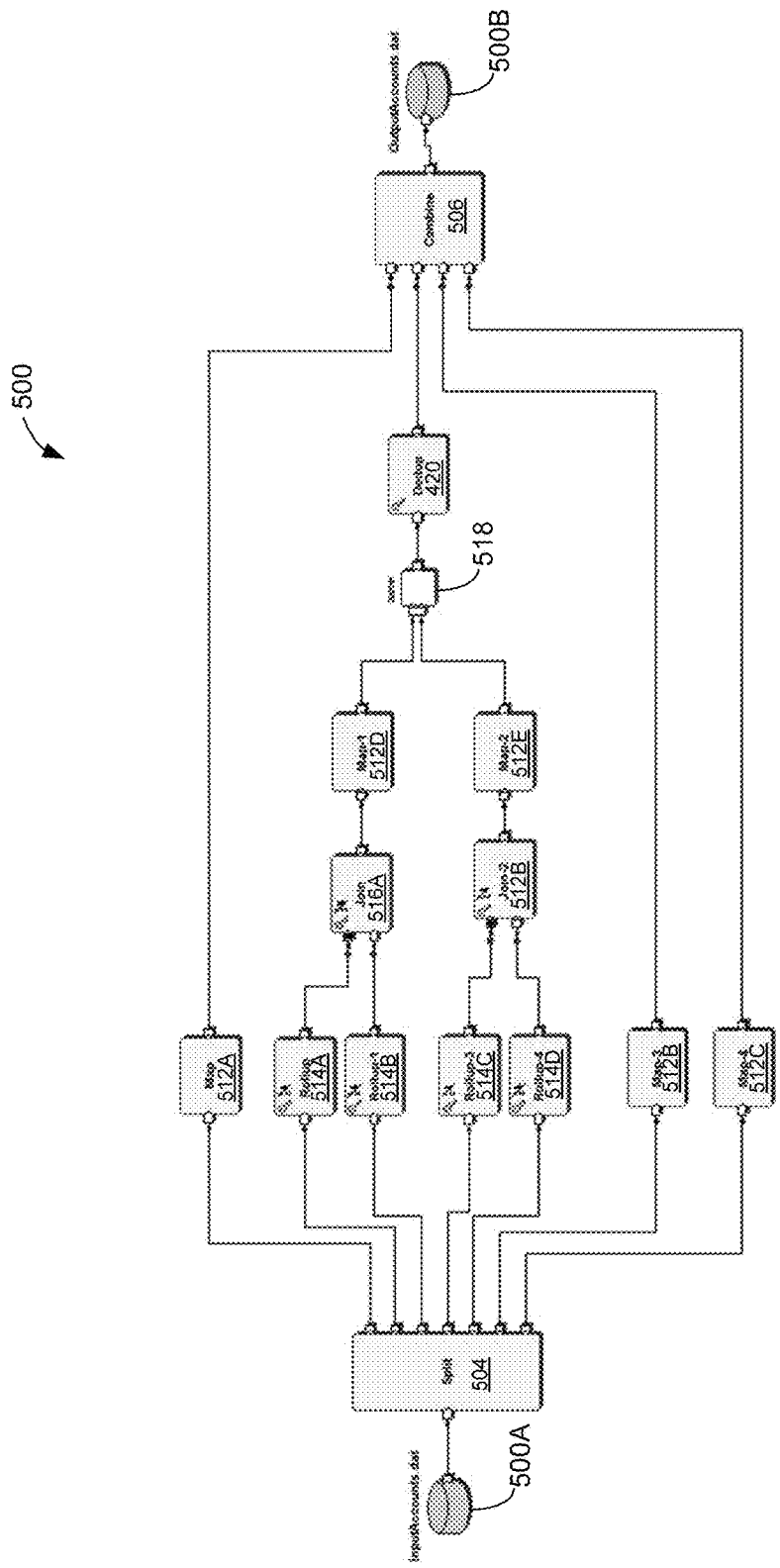
FIG. 5 is a diagram of a dataflow graph.

FIG. 5 shows an example of a dataflow graph 500 that is generated by the mapping module 106 to embody the logic of the mappings 114 defined by a user, and then executed by the execution module 112 to generate the output data. The dataflow graph 500 includes an input component 502A representing an input dataset storing the records that represent instances of the entities in the input hierarchy called InputAccounts.dat, and an output component 502B representing an output dataset storing the records that represent instances of the entities in the output hierarchy called OutputAccounts.dat.

The mapping module 106 uses a Split component 504 to retrieve input records from the input component 502A and a Combine component 506 to store output records in the output component 502B. In this example, the Split component 504 receives at its input port a flow of top-level records that include embedded records of any lower level entities as nested vectors of field values, formatted according to the DML input record format shown above. Alternatively, other types of components can be used to receive input records and store output records, such as components that read or write a database if entities correspond to tables within a database and instances of those entities correspond to rows in those tables, for example.

Each output port of the Split component 504 provides a flow of records representing instances of an input entity used as a source in one of the mappings 114. Any records nested within other records are extracted, so that a record representing an instance of a lower-level entity is removed from its parent record, and a record representing an instance of a higher-level entity does not include any child records. The mapping module 106 determines the number of output ports needed for the Split component 504 based on the structure of the particular mappings 114 that have been defined, including whether they are straight mappings or aggregated mappings. The mapping module 106 determines the number of input ports needed for the Combine component 506 (four in this example).

The mapping module 106 determines whether a mapping is a straight mapping or an aggregated mapping based on the key attributes that a user has defined for entities that are targets of at least one mapping (including entities of the output hierarchy or any temporary entities). For each key attribute of a target entity (which together make up its primary key), the mapping module 106 determines corresponding input attributes of the entity that is the source of that mapping (an entity of the input hierarchy or a temporary entity). These "mapped input attributes" may be directly mapped to a key attribute of the target entity (e.g., in a simple mapping), or may be used in an expression for determining a key attribute of the target entity (e.g., in a complex mapping).

Depending on the characteristics of these mapped input attributes, the mapping module 106 classifies the mapping as a "straight mapping" or an "aggregated mapping." The mapping module 106 compares the mapped input attributes with the one or more key attributes of the source entity (which together make up its primary key) to determine whether the mapped input attributes cover the source entity's primary key. If the mapped input attributes include all of the key attributes of the source entity, then the mapped input attributes cover the primary key. If the mapped input attributes include fewer than all of the key attributes of the source entity, then the mapped input attributes do not cover the primary key. If the mapped input attributes cover the primary key, then the mapping is guaranteed to find a unique instance of the source entity (with a particular source primary key) for each instance of the target entity (with a particular target primary key), and the mapping is classified as a "straight mapping." If the mapped input attributes do not cover the primary key, then the mapping is not guaranteed to find a unique instance of the source entity for each instance of the target entity, and the mapping is classified as an "aggregated mapping."

When determining whether or not the mapped input attributes cover the primary key, it may also be necessary to determine what kind of mapping exists between a key attribute of the target entity and a key attribute of a source entity. If the mapping is not a one-to-one mapping (e.g., is instead a many-to-one mapping), then it is possible that one primary key value will map onto the same value as another primary key value, and therefore there is no guarantee of a unique instance of the source entity for each instance of the target entity. The mapping is a one-to-one mapping if the function f(x) defined by the expression provided by the user is one-to-one in the mathematical sense (i.e., x !=y implies f(x) !=f(y), where "!=" means not equal.) If the mapping is a one-to-one mapping, then the one or more mapped input attributes have a one-to-one correspondence with respective key attributes of the output entity.

For an aggregated mapping, an aggregation operation is performed to potentially allow multiple instances of the source entity to contribute information (e.g., its attribute values) to the computation of a particular instance of the target entity. If it turns out that there is only a single instance of the source entity that matches the target entity's primary key, then the aggregation operation simply obtains information from that one instance for use in the mapping. In some cases, even if there are multiple instances of the source entity that match the target entity's primary key, the aggregation operation may simply select a single one of those instances for use in the mapping.

In this example, the mapping module 106 determines that there are three straight mappings, and two aggregated mappings, and generates components of the dataflow graph 500 needed to perform those mappings. One output port provides records representing instances of the top-level "in" entity to a Map component 512A for a straight mapping on line 1 of the Source-to-Target mappings section 304. Other output ports provide records representing instances of the in.checking_accounts and in.savings_accounts entities to a Map-3 component 512B and a Map-4 component 512C, respectively, for the straight mappings on lines 4 and 5 of the Source-to-Target mappings section 304. Components for these straight mappings (Map component 512A, Map-3 component 512B, and Map-4 component 512C) perform an operation that reads mapped attribute values from an instance of the source entity and writes those mapped attribute values to a corresponding instance of the target entity, which is received at a port of the Combine component 506. These components can be configured to optionally apply any filter defined for the corresponding mapping, or separate components may be added to the dataflow graph 500 to apply such filtering. The reason these three mappings are straight mappings is because the key attributes forming the primary key of the output entity are mapped to respective key attributes that together form the complete primary key of the input entity. For example, for the mapping on line 4, the primary key of the out.checking_accounts entity is made up of the key attributes out.checking_accounts.acct_id and out.master_account_number, which map to the complete primary key of the in.checking_accounts entity made up of the key attributes in.checking_accounts.acct_id and in.master_account_number.

Other output ports of the Split component 504 provide records representing instances of the entities used referenced in the expressions for the two aggregated mappings on lines 2 and 3 of the Source-to-Target mappings section 304. The reason these two mappings are aggregated mappings is because the key attributes forming the primary key of the output entity are mapped to respective attributes that do not include all of the key attributes of the input entity. For example, for the mapping on line 2, the primary key of the out.account_holders entity is made up of the key attributes out.account_holders.SSN and out.master_account_number, which do not include one of the key attributes of the primary key of the in.checking_accounts entity (i.e., the in.checking_accounts.acct_id attribute). To determine how the dataflow graph 500 is to perform an aggregation operation for a particular aggregated mapping, the mapping module 106 first determines whether the expressions provided by the user in the user interface 320 define such an aggregation operation for the attributes of the source and target entities used in the aggregated mapping. If so, the mapping module 106 will add to the dataflow graph 500 a rollup component that performs the aggregation operation (also called a "rollup" operation) to aggregate multiple instances of the input entity that share the same values for the mapped input attributes. If the expressions provided by the user do not provide expressions for the attributes used in the aggregated mapping that define such an aggregation operation, then the mapping module applies a default aggregation operation to be performed by the dataflow graph 500. For example, a "de-duplication" operation can be included as part of any aggregation operation implemented by the rollup component, in which the attribute values from the last of the multiple instances is used. This insertion of such a rollup component for each aggregated mapping ensures that, whether or not the user provides an explicit aggregation operation for mapping the attributes of the source and target entities, there will be a single unique instance of a target entity having a particular primary key.

Output ports of the Split component 504 provide records representing instances of the in.checking_accounts and in.savings_accounts entities to a Rollup component 514A and a Rollup-1 component 514B, respectively, for the aggregated mapping on line 2 of the Source-to-Target mappings section 304. Since the expressions for the attributes of this mapping include one expression that includes an aggregation operation in the form of two summations (i.e., on line 4 of the Expression/Rule column 324), the mapping module 106 adds a rollup component for each of the summations that performs a rollup over the key attributes that form the primary key of the target entity. In this example, the primary key of the target entity consists of the attributes: out.account_holders.SSN and out.master_account_number. The Rollup component 514A performs the first summation by adding the summand argument in.checking_accounts.balance for all instances that satisfy the summand condition based on these key attributes. In this example, the output entity out.account_holders includes SSN in its primary key, but SSN is not part of the primary key of the input entity in.checking_accounts, which means the defined summation using SSN as the match attribute may find multiple input entity instances with the same SSN value. The Rollup-1 component 514B performs the second summation by adding the summand argument in.savings_accounts.balance for all instances that satisfy the summand condition based on these key attributes.

The mapping module 106 adds other components to complete the aggregation operation. A Join component 516A adds finds results of the two summations performed by the rollup components where the key attribute values are the same, and provides a joined output record on its output port to a Map-1 component 512D. The Map-1 component 512D performs the sum of the two values in the joined record, and provides a record on its output port with that final result as the value of the out.account_holders.balance attribute, along with particular values of the key attributes associated with that final result.

Similarly, other output ports provide records representing instances of the in.savings_accounts and in.checking_accounts entities to a Rollup-3 component 514C and a Rollup-4 component 514D, respectively, for the aggregated mapping on line 3 of the Source-to-Target mappings section 304. The expressions for the attributes of this mapping also include one expression that includes an aggregation operation in the form of two summations. So, there are corresponding rollup components (Rollup-3 component 514C and Rollup-4 component 514D), and join and map components (Join-2 component 516B and Map-2 component 512E), performing similar operations as described above.

The mapping module 106 inserts a gather component 518 into the dataflow graph 500 to gather the results of the two successive mappings for the same target entity (out.account_holders), which forms a single flow of records from the two flows of records received (e.g., by appending the records from one flow after all the records from the other flow, or by merging the records alternating between flows). The mapping module 106 also inserts a deduplication component 420 to remove any duplicate records generated by the two mappings. For example, the mapping from line 2 may have found checking accounts without corresponding savings accounts with the same SSN, and the mapping from line 3 may have found savings accounts without corresponding checking accounts with the same SSN, but both mappings may have found a pair of checking and savings accounts with the same SSN.

For some mappings, the mapping module 106 may need to add additional components to the generated dataflow graph. For example, based on the input level of the input hierarchy and the output level of the output hierarchy, the graph may need to preform various operations in order to get particular information from a flow of input records, with the specified mapping rules, into the right fields of the output records. For an aggregated mapping, a rollup component may be needed to perform the associated aggregation operation, but there may also be other rollup components needed to perform additional aggregation operations. A join component may be needed if information in an output field is derived from information from two different input fields. For determining whether to include sort components, for example, the mapping module 106 compares how sort keys are mapped to determine whether and where a sort operation (performed by a sort component) is needed. In some implementations, the mapping module 106 alters the generated dataflow graph to optimize certain portions of the computation, such removing portions to reduce redundancies, or replacing portions with fewer or more efficient components. In addition to generating the components of the dataflow graph 500 and connecting their ports appropriately, the mapping module 106 may generate other data structures that may be needed for generating the mapped output data or for providing tracking information to a user. For example mapping module can be configured to store lineage information to be used to generate representations of the lineage of specific instances of the output entities (i.e., output records) that show the corresponding instances of the input entities (i.e., input records) from which they were generated and operations performed on those records and any intermediate records.

These mapping techniques can be used in situations where a portion of a dataflow graph is metaprogrammed (i.e., automatically generated based on some user-defined constraints). In one such example, a dataflow graph will be constructed for converting input data from a user-defined input format to a user-defined output format according to a user-defined transformation. The dataflow graph may include a generic container graph that includes a sub-graph interface, as described for example in U.S. application Ser. No. 14/561,435, filed on Dec. 5, 2014, titled "MANAGING INTERFACES FOR SUB-GRAPHS," incorporated herein by reference. The sub-graph interface enables a particular implementation of a sub-graph to be inserted into the container graph before runtime, derived at least in part from user input. Just before runtime, a user may be asked a number of questions related to the input format, the output format, and/or mappings between fields of the input format and fields of the output format. Based on the user's answers to the questions, an implementation of the sub-graph is automatically generated (i.e., metaprogrammed) using the mapping techniques.

The mapping approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computing system, for processing data to convert between representations that reorganize output entities with respect to input entities such that key attributes of input entities are different from key attributes of output entities, the computing system including:
   a data storage system storing entity data representing a plurality of entities, with each entity having one or more attributes, at least some of the entities each having multiple instances, and at least some of the instances each having respective values for one or more of the attributes, where the plurality of entities include a plurality of input entities and a plurality of output entities;
   an input device or port for receiving input data that includes one or more mappings that each define a correspondence between one or more input attributes of one of the input entities and one or more output attributes of one of the output entities, where a first input entity includes a plurality of key attributes identified as part of a unique compound key for the input entity, and a first output entity includes a plurality of key attributes identified as part of a unique compound key for the output entity;
   an output device or port for displaying a user interface configured to receive the input data; and
   at least one processor configured to compute result information displayed in the user interface, the result information characterizing a result of processing instances of the input entities to generate instances of the output entities according to the one or more mappings included in the input data, the computing including:
   processing instances of the first input entity to generate instances of the first output entity;
   determining one or more mapped input attributes of the first input entity that correspond to each of the plurality of key attributes of the first output entity, based on the one or more mappings;
   generating the instances of the first output entity based on the determined one or more mapped input attributes, where the generating includes reorganizing entity data within the instances of the first input entity to provide reorganized entity data within the instances of the first output entity, and where the reorganizing is based at least in part on a difference between the plurality of key attributes identified as part of the unique compound key for the input entity and the plurality of key attributes identified as part of the unique compound key for the output entity;
   computing a total number of instances of the first input entity that were processed; and
   computing a total number of instances of the first output entity that were generated.

2. The computing system of claim 1, wherein displaying the result information in the user interface includes displaying the total number of instances of the first output entity in association with a representation of the first output entity.

3. The computing system of claim 2, wherein displaying the result information in the user interface includes displaying the total number of instances of the first input entity in association with a representation of the first input entity.

4. The computing system of claim 1, wherein displaying the result information in the user interface includes displaying multiple elements representing one or more mappings between attributes of a displayed input entity and attributes of a displayed output entity, displaying an icon for each element that indicates whether or not the input data for any mappings between the displayed input entity and displayed output entity assign an output attribute to: (1) an input attribute of the same name, or (2) a constant value.

5. The computing system of claim 1, wherein determining one or more mapped input attributes of the input entity that correspond to each of the plurality of key attributes of the first output entity includes determining whether the one or more mapped input attributes have a one-to-one correspondence with respective key attributes of the output entity.

6. The computing system of claim 1, wherein the computing further includes comparing the mapped input attributes with the plurality of key attributes of the first input entity to determine whether the mapped input attributes include: (1) all of the key attributes of the input entity, or (2) fewer than all of the key attributes of the input entity.

7. The computing system of claim 6, wherein the processing further includes generating the instances of the output entity based on: (1) a one-to-one correspondence between the instances of the output entity and instances of the input entity that have matching key attributes, in response to determining that the mapped input attributes include all of the key attributes of the input entity, or (2) an aggregation of multiple instances of the input entity that share the same values for the mapped input attributes, in response to determining that the mapped input attributes include fewer than all of the key attributes of the input entity.

8. The computing system of claim 1, wherein the entity data represent a plurality of output entities that are related according to a hierarchy, where at least one root output entity is at a highest level of the hierarchy and one or more output entities are at one or more levels below the highest level of the hierarchy, and each output entity at a level lower than the root entity is a sub-entity of a single output entity.

9. The computing system of claim 8, wherein the entity data represent a plurality of input entities that are related according to a hierarchy, where at least one root input entity is at a highest level of the hierarchy and one or more input entities are at one or more levels below the highest level of the hierarchy, and each input entity at a level lower than the root entity is a sub-entity of a single input entity.

10. The computing system of claim 8, wherein at least a first entity that is not related to the plurality of output entities that are related according to a hierarchy includes at least one attribute that is referenced as an output attribute by at least one of the mappings included in the input data.

11. The computing system of claim 10, wherein the first entity includes at least one attribute that is referenced as an input attribute by at least one of the mappings included in the input data.

12. The computing system of claim 1, wherein a plurality of instances of a first entity that is a sub-entity of a second entity each include a common value of a key attribute of the first entity that identifies a particular instance of the second entity.

13. The computing system of claim 12, wherein the first entity corresponds to a first set of records, the second entity corresponds to a second set of records, and the key attribute of the first entity corresponds to a foreign key field of the first set of records that identifies a value included in a primary key field of a particular record in the second set of records.

14. The computing system of claim 1, wherein a plurality of instances of a first entity that is a sub-entity of a second entity correspond to a plurality of elements of a vector that is included within a data structure of a particular instance of the second entity.

15. The computing system of claim 14, wherein the processing further includes generating the instances of the output entity using a dataflow graph to process the instances of the input entity to generate the instances of the output entity, the dataflow graph including nodes representing components configured to perform operations on instances of an entity, and links between nodes representing flows of instances between components.

16. The computing system of claim 15, wherein the dataflow graph includes at least one split component that is configured to extract one or more vectors of instances of a sub-entity from a data structure of an instance of another entity based on the input attributes of the one or more mappings, and at least one combine component that is configured to insert one or more vectors of instances of a sub-entity into a data structure of an instance of another entity based on the output attributes of the one or more mappings.

17. A computing system, for processing data to convert between representations that reorganize output entities with respect to input entities such that key attributes of input entities are different from key attributes of output entities, the computing system including:
means for storing entity data representing a plurality of entities, with each entity having one or more attributes, at least some of the entities each having multiple instances, and at least some of the instances each having respective values for one or more of the attributes, where the plurality of entities include a plurality of input entities and a plurality of output entities;
means for receiving input data that includes one or more mappings that each define a correspondence between one or more input attributes of one of the input entities and one or more output attributes of one of the output entities, where a first input entity includes a plurality of key attributes identified as part of a unique compound key for the input entity, and a first output entity includes a plurality of key attributes identified as part of a unique compound key for the output entity;
means for displaying a user interface configured to receive the input data; and
means for computing result information displayed in the user interface, the result information characterizing a result of processing instances of the input entities to generate instances of the output entities according to the one or more mappings included in the input data, the computing including:
processing instances of the first input entity to generate instances of the first output entity;
determining one or more mapped input attributes of the first input entity that correspond to each of the plurality of key attributes of the first output entity, based on the one or more mappings;
generating the instances of the first output entity based on the determined one or more mapped input attributes, where the generating includes reorganizing entity data within the instances of the first input entity to provide reorganized entity data within the instances of the first output entity, and where the reorganizing is based at least in part on a difference between the plurality of key attributes identified as part of the unique compound key for the input entity and the plurality of key attributes identified as part of the unique compound key for the output entity;
computing a total number of instances of the first input entity that were processed; and
computing a total number of instances of the first output entity that were generated.

18. A method for processing data in a computing system to convert between representations that reorganize output entities with respect to input entities such that key attributes of input entities are different from key attributes of output entities, the method including:
storing, in a data storage system, entity data representing a plurality of entities, with each entity having one or more attributes, at least some of the entities each having multiple instances, and at least some of the instances each having respective values for one or more of the attributes, where the plurality of entities include a plurality of input entities and a plurality of output entities;
receiving, over an input device or port, input data that includes one or more mappings that each define a correspondence between one or more input attributes of one of the input entities and one or more output attributes of one of the output entities, where a first input entity includes a plurality of key attributes identified as part of a unique compound key for the input entity, and a first output entity includes a plurality of key attributes identified as part of a unique compound key for the output entity;
displaying, over an output device or port, a user interface configured to receive the input data; and
computing, with at least one processor, result information displayed in the user interface, the result information characterizing a result of processing instances of the input entities to generate instances of the output entities according to the one or more mappings included in the input data, the computing including:
processing instances of the first input entity to generate instances of the first output entity;
determining one or more mapped input attributes of the first input entity that correspond to each of the plurality of key attributes of the first output entity, based on the one or more mappings;
generating the instances of the first output entity based on the determined one or more mapped input attributes, where the generating includes reorganizing entity data within the instances of the first input entity to provide reorganized entity data within the instances of the first output entity, and where the reorganizing is based at least in part on a difference between the plurality of key attributes identified as part of the unique compound key for the input entity and the plurality of key attributes identified as part of the unique compound key for the output entity;
computing a total number of instances of the first input entity that were processed; and computing a total number of instances of the first output entity that were generated.

19. The method of claim 18, wherein displaying the result information in the user interface includes displaying the total number of instances of the first output entity in association with a representation of the first output entity.

20. The method of claim 19, wherein displaying the result information in the user interface includes displaying the total number of instances of the first input entity in association with a representation of the first input entity.

21. The method of claim 18, wherein displaying the result information in the user interface includes displaying multiple elements representing one or more mappings between attributes of a displayed input entity and attributes of a displayed output entity, displaying an icon for each element that indicates whether or not the input data for any mappings between the displayed input entity and displayed output entity assign an output attribute to: (1) an input attribute of the same name, or (2) a constant value.

22. The method of claim 18, wherein determining one or more mapped input attributes of the input entity that correspond to each of the plurality of key attributes of the first output entity includes determining whether the one or more mapped input attributes have a one-to-one correspondence with respective key attributes of the output entity.

23. The method of claim 18, wherein the computing further includes comparing the mapped input attributes with the plurality of key attributes of the first input entity to determine whether the mapped input attributes include: (1) all of the key attributes of the input entity, or (2) fewer than all of the key attributes of the input entity.

24. The method of claim 23, wherein the processing further includes generating the instances of the output entity based on: (1) a one-to-one correspondence between the instances of the output entity and instances of the input entity that have matching key attributes, in response to determining that the mapped input attributes include all of the key attributes of the input entity, or (2) an aggregation of multiple instances of the input entity that share the same values for the mapped input attributes, in response to determining that the mapped input attributes include fewer than all of the key attributes of the input entity.

25. The method of claim 18, wherein the entity data represent a plurality of output entities that are related according to a hierarchy, where at least one root output entity is at a highest level of the hierarchy and one or more output entities are at one or more levels below the highest level of the hierarchy, and each output entity at a level lower than the root entity is a sub-entity of a single output entity.

26. The method of claim 25, wherein the entity data represent a plurality of input entities that are related according to a hierarchy, where at least one root input entity is at a highest level of the hierarchy and one or more input entities are at one or more levels below the highest level of the hierarchy, and each input entity at a level lower than the root entity is a sub-entity of a single input entity.

27. The method of claim 25, wherein at least a first entity that is not related to the plurality of output entities that are related according to a hierarchy includes at least one attribute that is referenced as an output attribute by at least one of the mappings included in the input data.

28. The method of claim 27, wherein the first entity includes at least one attribute that is referenced as an input attribute by at least one of the mappings included in the input data.

29. The method of claim 18, wherein a plurality of instances of a first entity that is a sub-entity of a second entity each include a common value of a key attribute of the first entity that identifies a particular instance of the second entity.

30. The method of claim 29, wherein the first entity corresponds to a first set of records, the second entity corresponds to a second set of records, and the key attribute of the first entity corresponds to a foreign key field of the first set of records that identifies a value included in a primary key field of a particular record in the second set of records.

31. The method of claim 18, wherein a plurality of instances of a first entity that is a sub-entity of a second entity correspond to a plurality of elements of a vector that is included within a data structure of a particular instance of the second entity.

32. The method of claim 31, wherein the processing further includes generating the instances of the output entity using a dataflow graph to process the instances of the input entity to generate the instances of the output entity, the dataflow graph including nodes representing components configured to perform operations on instances of an entity, and links between nodes representing flows of instances between components.

33. The method of claim 32, wherein the dataflow graph includes at least one split component that is configured to extract one or more vectors of instances of a sub-entity from a data structure of an instance of another entity based on the input attributes of the one or more mappings, and at least one combine component that is configured to insert one or more vectors of instances of a sub-entity into a data structure of an instance of another entity based on the output attributes of the one or more mappings.

34. Software stored in non-transitory form on a computer-readable medium, for processing data to convert between representations that reorganize output entities with respect to input entities such that key attributes of input entities are different from key attributes of output entities, the software including instructions for causing a computing system to:
  store, in a data storage system, entity data representing a plurality of entities, with each entity having one or more attributes, at least some of the entities each having multiple instances, and at least some of the instances each having respective values for one or more of the attributes, where the plurality of entities include a plurality of input entities and a plurality of output entities;
  receive, over an input device or port, input data that includes one or more mappings that each define a correspondence between one or more input attributes of one of the input entities and one or more output attributes of one of the output entities, where a first input entity includes a plurality of key attributes identified as part of a unique compound key for the input entity, and a first output entity includes a plurality of key attributes identified as part of a unique compound key for the output entity;
  display, over an output device or port, a user interface configured to receive the input data; and
  compute, with at least one processor, result information displayed in the user interface, the result information characterizing a result of processing instances of the input entities to generate instances of the output entities according to the one or more mappings included in the input data, the computing including:
    processing instances of the first input entity to generate instances of the first output entity;

determining one or more mapped input attributes of the first input entity that correspond to each of the plurality of key attributes of the first output entity, based on the one or more mappings;

generating the instances of the first output entity based on the determined one or more mapped input attributes, where the generating includes reorganizing entity data within the instances of the first input entity to provide reorganized entity data within the instances of the first output entity, and where the reorganizing is based at least in part on a difference between the plurality of key attributes identified as part of the unique compound key for the input entity and the plurality of key attributes identified as part of the unique compound key for the output entity;

computing a total number of instances of the first input entity that were processed; and computing a total number of instances of the first output entity that were generated.

35. The software of claim 34, wherein displaying the result information in the user interface includes displaying the total number of instances of the first output entity in association with a representation of the first output entity.

36. The software of claim 35, wherein displaying the result information in the user interface includes displaying the total number of instances of the first input entity in association with a representation of the first input entity.

37. The software of claim 34, wherein displaying the result information in the user interface includes displaying multiple elements representing one or more mappings between attributes of a displayed input entity and attributes of a displayed output entity, displaying an icon for each element that indicates whether or not the input data for any mappings between the displayed input entity and displayed output entity assign an output attribute to: (1) an input attribute of the same name, or (2) a constant value.

38. The software of claim 34, wherein determining one or more mapped input attributes of the input entity that correspond to each of the plurality of key attributes of the first output entity includes determining whether the one or more mapped input attributes have a one-to-one correspondence with respective key attributes of the output entity.

39. The software of claim 34, wherein the computing further includes comparing the mapped input attributes with the plurality of key attributes of the first input entity to determine whether the mapped input attributes include: (1) all of the key attributes of the input entity, or (2) fewer than all of the key attributes of the input entity.

40. The software of claim 39, wherein the processing further includes generating the instances of the output entity based on: (1) a one-to-one correspondence between the instances of the output entity and instances of the input entity that have matching key attributes, in response to determining that the mapped input attributes include all of the key attributes of the input entity, or (2) an aggregation of multiple instances of the input entity that share the same values for the mapped input attributes, in response to determining that the mapped input attributes include fewer than all of the key attributes of the input entity.

41. The software of claim 34, wherein the entity data represent a plurality of output entities that are related according to a hierarchy, where at least one root output entity is at a highest level of the hierarchy and one or more output entities are at one or more levels below the highest level of the hierarchy, and each output entity at a level lower than the root entity is a sub-entity of a single output entity.

42. The software of claim 41, wherein the entity data represent a plurality of input entities that are related according to a hierarchy, where at least one root input entity is at a highest level of the hierarchy and one or more input entities are at one or more levels below the highest level of the hierarchy, and each input entity at a level lower than the root entity is a sub-entity of a single input entity.

43. The software of claim 41, wherein at least a first entity that is not related to the plurality of output entities that are related according to a hierarchy includes at least one attribute that is referenced as an output attribute by at least one of the mappings included in the input data.

44. The software of claim 43, wherein the first entity includes at least one attribute that is referenced as an input attribute by at least one of the mappings included in the input data.

45. The software of claim 34, wherein a plurality of instances of a first entity that is a sub-entity of a second entity each include a common value of a key attribute of the first entity that identifies a particular instance of the second entity.

46. The software of claim 45, wherein the first entity corresponds to a first set of records, the second entity corresponds to a second set of records, and the key attribute of the first entity corresponds to a foreign key field of the first set of records that identifies a value included in a primary key field of a particular record in the second set of records.

47. The software of claim 34, wherein a plurality of instances of a first entity that is a sub-entity of a second entity correspond to a plurality of elements of a vector that is included within a data structure of a particular instance of the second entity.

48. The software of claim 47, wherein the processing further includes generating the instances of the output entity using a dataflow graph to process the instances of the input entity to generate the instances of the output entity, the dataflow graph including nodes representing components configured to perform operations on instances of an entity, and links between nodes representing flows of instances between components.

49. The software of claim 48, wherein the dataflow graph includes at least one split component that is configured to extract one or more vectors of instances of a sub-entity from a data structure of an instance of another entity based on the input attributes of the one or more mappings, and at least one combine component that is configured to insert one or more vectors of instances of a sub-entity into a data structure of an instance of another entity based on the output attributes of the one or more mappings.

* * * * *